United States Patent [19]

Park

[11] Patent Number: 5,608,582

[45] Date of Patent: Mar. 4, 1997

[54] AUDIO SIGNAL REPRODUCING APPARATUS AND METHOD FOR USE DURING A SLOW REPRODUCTION OPERATION

[75] Inventor: Gyoung-chan Park, Suwon, Rep. of Korea

[73] Assignee: Samsung Electronics Co., Ltd., Kyungki-do, Rep. of Korea

[21] Appl. No.: 268,326

[22] Filed: Jun. 30, 1994

[30] Foreign Application Priority Data

Jul. 27, 1993 [KR] Rep. of Korea ............... 1993-14067
Feb. 21, 1994 [KR] Rep. of Korea ............... 1994-3058

[51] Int. Cl.⁶ ............................................. G11B 5/00
[52] U.S. Cl. ............................ 360/8; 386/75; 386/100
[58] Field of Search ........................... 360/19.1, 10.1, 360/61, 8, 26, 50, 24, 7, 38.1, 10.3, 9.1; 358/335, 341, 343

[56] References Cited

U.S. PATENT DOCUMENTS

| | | | |
|---|---|---|---|
| 4,376,874 | 3/1983 | Karban et al. | 360/8 X |
| 4,463,389 | 7/1984 | Golding | 360/8 X |
| 4,717,972 | 1/1988 | Heitmann | 360/8 |
| 4,729,041 | 3/1988 | Kuroda | 360/38.1 X |
| 4,896,221 | 1/1990 | Mashimo | 360/10.1 X |
| 4,977,461 | 12/1990 | Ichimura | 360/38.1 X |
| 5,315,401 | 5/1994 | Okada et al. | 358/337 |
| 5,317,414 | 5/1994 | Shindo et al. | 360/38.1 X |

*Primary Examiner*—Andrew L. Sniezek
*Attorney, Agent, or Firm*—Sughrue, Mion, Zinn, Macpeak & Seas

[57] ABSTRACT

In an apparatus for sequentially reproducing the audio signal recorded in an adjacent track with a time interval T, an audio signal reproducing apparatus which reproduces an audio signal during a slow reproduction mode of operation includes a delay receiving an audio signal and generating a delayed audio signal, a signal-free period detector for detecting the period in which the received audio signal is discontinuous, and a switch, controlled by the signal-free period detector, for selectively providing one of the received audio signal and the delayed audio signal. The audio signal reproducing apparatus, which can be provided in a video tape recorder or a video disk player with a slow reproduction mode of operation can reproduce the audio signal without the annoying audio characteristics associated which sounds produced by a conventional slow reproduction apparatus. A method of generating a continuous audio signal during slow reproduction is also described.

7 Claims, 3 Drawing Sheets

FIG. 1
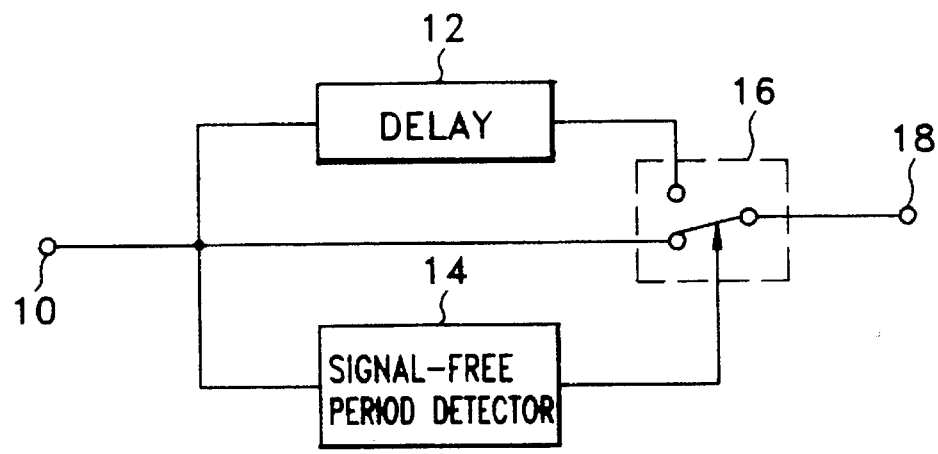
FIG. 2A
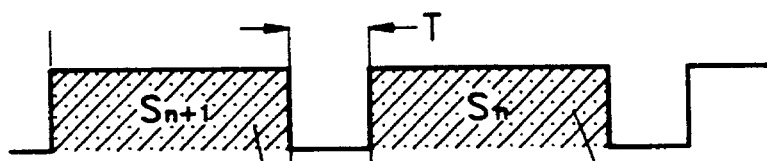
FIG. 2B
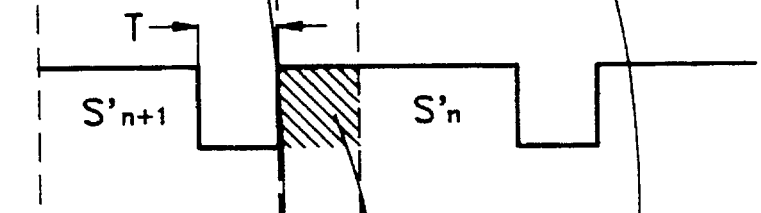
FIG. 2C
FIG. 2D
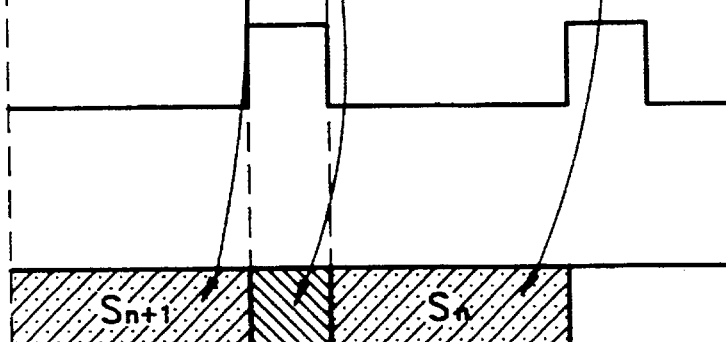

AUDIO SIGNAL REPRODUCING APPARATUS AND METHOD FOR USE DURING A SLOW REPRODUCTION OPERATION

BACKGROUND OF THE INVENTION

1. Field of the Invention

The present invention relates to an audio signal reproducing apparatus for a device such as a video tape recorder, a video disk player, an accompaniment apparatus and the like. More specifically, the present invention relates to an audio signal reproducing apparatus for use during a slow reproduction period of operation.

Korean Utility Model Application No. 93-14067 and Korean Patent Application No. 94-3058 are incorporated herein by reference for all purposes.

2. Description of Related Art

A slow reproduction process is performed to reproduce an information signal at a slower than normal speed. A video tape recorder accomplishes slow reproduction by alternatively repeating a still reproduction and a normal reproduction. In an exemplary case, the video tape is successively moved during slow reproduction while the video image is repeatedly reproduced from the same track for a required number of times, the number of times corresponding to the reproduction rate.

In a constant angular velocity (CAV) type video disk player, since one frame of a television image is recorded per one rotation of a disk and since a vertical synchronizing signal is placed on each line in the radial direction, the same track can be repeatedly reproduced for the a required number of times by performing a track jump operation to thereby perform slow motion playback. In contrast, a constant linear velocity (CLV) type video disk player cannot record an integer number of image frames or fields during one revolution of the disk. Therefore, by simply performing a track jump operation as in the CAV-type video disk player, a reproduced image signal becomes discontinuous along the time axis. The horizontal synchronizing signal also becomes discontinuous, thereby causing degraded servo operation. Therefore, the CLV-type video disk player uses one field of video memory and a phase-shifted reference synchronizing signal to produce a slow motion replay image.

During the slow reproduction operation of the video tape recorder or video disk player described immediately above, only the video signal is reproduced. Since there is considerable similarity in terms of time between adjacent image frames, repeatedly reproducing the same video frame is not offensive to the human eye. An audio signal is not reproduced, however, since audio signals seldom have a substantial similarity in terms of time. Thus, repeatedly reproducing the same audio signal produces an extremely unpleasant sound.

However, it is preferable to reproduce the audio signal together with the video image, similar to that for normal reproduction, to thereby permit a viewer to feel the performance vividly.

In a video accompaniment apparatus for generating accompaniment signals for a song, it is necessary to adjust an accompaniment speed depending on a singer's personal taste. It will be noted that the reproduction speed of accompaniment signals should be adjusted accordingly. In an accompaniment apparatus using an audio/video signal recorded in a video tape recorder or on a video disk, a separate apparatus wherein both the audio and video signals are reproduced slowly by a slow reproduction is necessary.

SUMMARY OF THE INVENTION

The principal object of the present invention to provide an apparatus for generating audio signals whose discontinuous period is compensated during a slow reproduction operation. The present invention is particularly suited for use in an audio player such as a video tape recorder, a video disk player or an accompaniment apparatus.

This and other objects, features and advantages according to the present invention are provided by an audio signal reproducing apparatus including:

a delay for generating a delayed audio signal from a received audio signal;

a signal-free period detector for detecting the period in which the received audio signal is discontinuous; and a switch operatively connected to and controlled by the signal-free period detector, for selectively providing one of the received audio signal and the delayed audio signal.

This and other objects, features and advantages according to the present invention are provided by an audio signal reproducing apparatus including:

a first delay for generating a delayed audio signal from a received audio signal;

a second delay including a plurality of serially connected delay elements receiving the delayed audio signal;

a first signal-free period detector for detecting a discontinuous first period of the received audio signal for generating a first control signal;

a second signal-free period detector for detecting a discontinuous second period of delayed audio signal and for generating a second control signal;

a first selection switch receiving respective output audio signals from the delay elements to thereby generate a variably delayed audio signal delayed by a predetermined delay amount in response to the first control signal; and a second selection switch for selectively providing one of the delayed audio signal and the variably delayed audio signal in response to the second control signal.

These and other objects, features and advantages of the invention are disclosed in or will be apparent from the following description of preferred embodiments.

BRIEF DESCRIPTION OF THE DRAWINGS

The above objects and advantages of the present invention will become more apparent by describing in detail preferred embodiments thereof with reference to the attached drawings in which:

FIG. 1 is a high level block diagram of the audio signal reproducing apparatus according to a first embodiment of the present invention;

FIGS. 2A through 2D are waveforms which are useful in explaining the operation of the apparatus shown in FIG. 1;

DETAILED DESCRIPTION OF THE PREFERRED EMBODIMENTS

Figure 3:
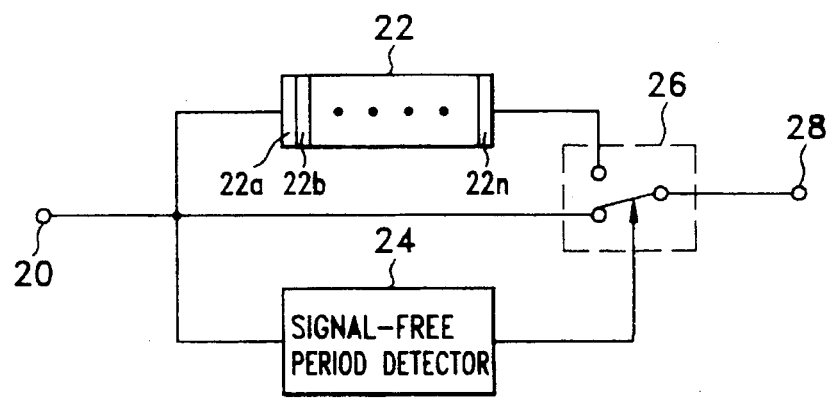
FIG. 3 is a high level block diagram of the audio signal reproducing apparatus according to another preferred embodiment of the present invention.

In FIG. 1, a reference numeral 10 represents an input terminal which receives the audio signal having a periodically discontinuous period, numeral 18 represents an output terminal which supplies the audio signal whose discontinuous period is eliminated, numeral 14 indicates a signal-free period detector for detecting the discontinuous period of the audio signal received by the input terminal 10, numeral 12 depicts a delay for delaying the audio signal received by the input terminal 10 by a discontinuous period and providing the delayed audio signal, and numeral 16 portrays a switch for selectively supplying to an output terminal 18 one of the audio signals received by the input terminal 10 and the audio signal delayed by the delay 12 in accordance with a control signal provided by signal-free period detector 14.

It will be appreciated that delay 12 shown in FIG. 1, for the exemplary case wherein the discontinuous period of the audio signal is short, advantageously can be constructed from either a delay line using a distributed constant or a delay using a varactor diode. It will also be appreciated that when the discontinuous period of the audio signal is long, a memory device, which advantageously is connected between complementary analog-to-digital and digital-to-analog converters, is adopted. Preferably, such a memory device should be constructed so as to perform a first-in-first-out (FIFO) operation. It will be noted that signal-free period detector 14 may be constructed from a comparator in an exemplary case.

FIGS. 2A to 2D are waveforms showing the operation of the apparatus shown in FIG. 1. More specifically, FIG. 2A is a waveform showing the audio signal received by the input terminal 10 in FIG. 1. It will be noted that the waveform of FIG. 2A includes a discontinuous period of period length T appearing periodically in a signal waveform $S_n$. The audio signal having such a regularly occurring discontinuous period is generated during a slow reproduction of a video tape recorder or a video disk player. In FIG. 2A, the notations $S_n$ and $S_{n+1}$ indicate signal waveforms located before and after the discontinuous period, respectively.

FIG. 2B is a waveform of the audio signal delayed by the delay 12 of FIG. 1. It will be noted that the waveform shown in FIG. 2A is delayed in FIG. 2B by the time period T of the discontinuous period. FIG. 2C is a waveform illustrating the control signal generated in the signal-free period detector 14 in FIG. 1, which control signal is a logic signal maintaining a high state only during the discontinuous period of the audio signal shown in FIG. 2A.

FIG. 2D is a waveform of the audio signal output from the switch 16 in FIG. 1. It will be appreciated that the rear part of the waveform shown in FIG. 2B, i.e., the rear part corresponding to the discontinuous period of the signal waveform $S'_n$, is synthesized in the discontinuous period of the waveform $S_n$ shown in FIG. 2A.

When the audio signal shown by the waveform of FIG. 2D is output through a speaker, it will be comprehended that the audio signal is prolonged for a predetermined time T during a regular interval. As the interval becomes longer with respect to the prolonged period, the adverse effects on the output audio signal are appreciably lessened.

FIG. 3 is a block diagram showing the construction of an alternate embodiment of the present invention, wherein the delay 12 in the apparatus shown in FIG. 1 is realized as a plurality of delay elements $22_a$–$22_n$ constituting delay 22. The operations of input terminal 20, output terminal 28, signal-free period detector 24 and switch 26 of FIG. 3 are substantially the same as the input terminal 10, the output terminal 18, the signal-free period detector 14 and the switch 16, respectively, previously described with respect to FIG. 1.

It will be appreciated that the delay 22 is constructed by serially connecting a plurality of delay elements each acting as delay means and each having identical delay characteristics $\Delta T$. The delay 22 can be effectively used when the discontinuous period is prolonged.

The alternative forms of the apparatus describe with respect to FIGS. 1 and 3 each include a delay having a constant delay characteristic. When the time intervals of the discontinuous period of the signal input through the input terminals 10 and 20 are different, proper compensation for the discontinuity cannot be obtained. For example, assume that the length of the discontinuous period is T and that the delay characteristic of the delays 12 and 22 is Dt. When T is greater than Dt, a discontinuous period having the time interval corresponding to the portion subtracted from T by Dt (that is, T–Dt) will exist in the audio signal output from the switches 16 and 26.

Figure 4:
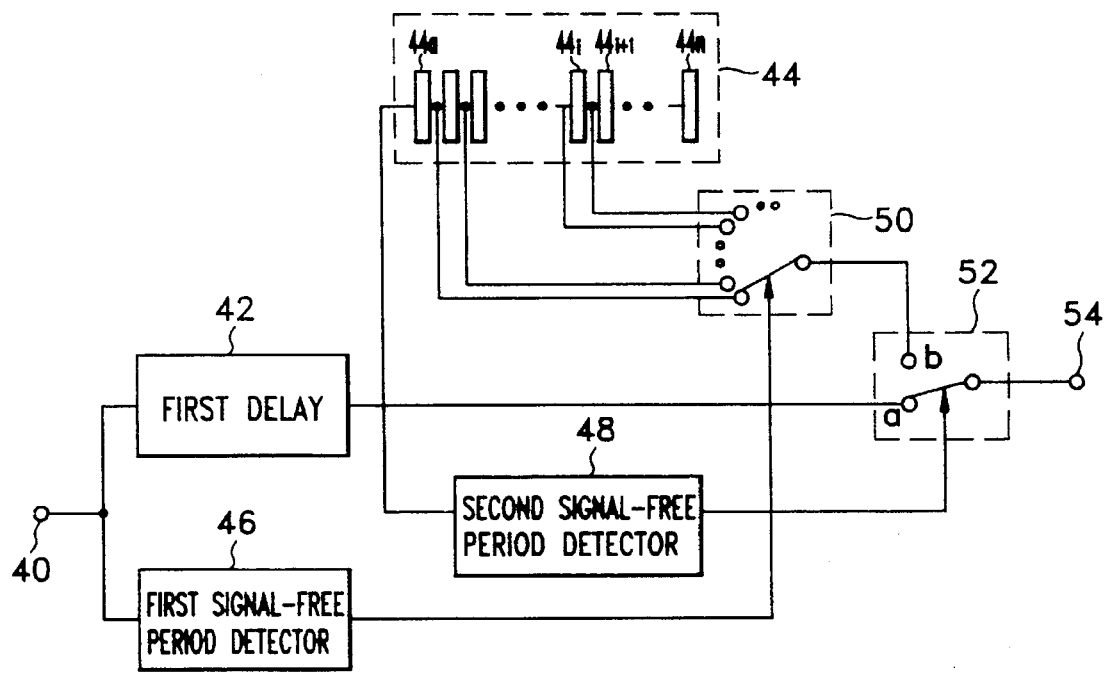
FIG. 4 is a high level block diagram of the audio signal reproducing apparatus according to yet another preferred embodiment of the present invention.

FIG. 4 shows still another preferred embodiment of the present invention. The circuitry depicted in FIG. 4 is particularly advantageous when the discontinuous period of the audio signal is irregular although the discontinuous period is generated at a regular interval.

Referring to FIG. 4, a reference numeral 40 represents an input terminal for receiving the audio signal having the discontinuous periods having an irregular time interval, numeral 54 indicates an output terminal for supplying the audio signal whose discontinuous period is eliminated, numeral 42 represents a first delay for delaying the audio signal received by the input terminal 40 for a predetermined period and then providing the delayed audio signal, numeral 44 represents a second delay for again delaying the audio signal delayed by the first delay 42, numeral 46 represents a first signal-free period detector for detecting the discontinuous period of the audio signal received by the input terminal 40, numeral 48 represents a second signal-free period detector for detecting the discontinuous period of the audio signal delayed by the first delay 42, numeral 50 represents a first selection switch for selecting one of the signals output from the respective delay means $44_a$ to $44_n$ comprising the second delay 44 under the control of the first signal-free period detector 46, and numeral 52 represents a second selection switch for selecting the audio signal delayed by the first delay 42 under the control of the second signal-free period detector 48 and the signal output from the first switch 50 and supplying the selected audio signal to the output terminal 54.

In the apparatus shown in FIG. 4, the second delay 44 is constructed from a plurality of serially-connected delay elements $44_a$–$44_n$, each having a predetermined delay characteristic $\Delta T$. Advantageously, the first signal-free period detector 46 may include a comparator operatively connected to a counter. The connection points of the respective delay elements $44_a$ to $44_n$ are connected to the respective input terminals of the first selection switch 50. The first selection switch 50 selects one of the switch input terminals in response to a control signal applied thereto and connects the selected terminal to the input terminal b of the second selection switch 52. It will be readily appreciated that the delay time of the signal applied to the input terminal b of the second selection switch 52 can be varied in accordance with the operation of the first selection switch 50.

The audio signal received through the input terminal 40 is delayed by the time interval between a first discontinuous period and a following discontinuous period by the first delay 42. The switching of the first selection switch 50 is controlled by the audio signal input to the first delay 42. The second selection switch 52 is switched in the discontinuous period of the audio signal delayed by the first delay 42. In other words, the delay characteristic of the second delay is adjusted by detecting the time interval of the discontinuous period of the audio signal in advance. It will be noted that this permits a more effective audio signal compensation operation to be performed. The delay time T of the second delay 44 is advantageously the same as the time interval of the discontinuous period detected by the first signal-free period detector 46. The audio signal applied to terminal b of the second selection switch 52 is delayed by the second delay 44 during the discontinuous period of the signal output from the first delay 42. Second selection switch 52 selects the signal supplied to its respective input terminals in response to the control signal generated by detector 48 to thereby supply the selected signal to the output terminal 54. In this manner, an audio signal whose discontinuous period has been eliminated is obtained at the output terminal 54.

It will be appreciated that first selection switch 50 selects and outputs one of a plurality of delayed signals applied thereto. Since the delay amount of the signal output from the first selection switch 50 should be the same as the signal-free period, the magnitude of the signal-free period, which advantageously can be obtained by counting the detected result of the comparator, is provided to the first selection switch 50 as its select signal.

It should be noted that there is an advantageous relationship between an image signal and its accompanying audio signal. During an exemplary slow reproduction process, assuming that the delay time between screens is a multiple of the field period of the image signal, each delay amount of respective delay elements 44a through 44n, e.g., second delay 44 in FIG. 4, is a multiple of the field period of the image signal. Preferably, the above-mentioned multiple is an integer multiple.

FIGS. 5A to 5E are waveforms which are useful in illustrating the operation of the apparatus shown in FIG. 4.

Figure 5A:
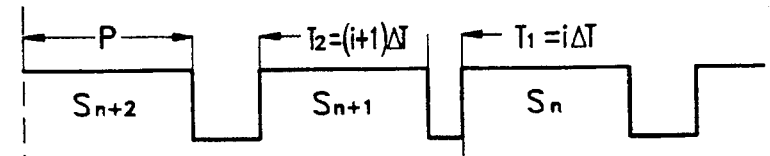
FIGS. 5A through 5G are waveforms which are useful in illustrating the operation of the apparatus shown in FIG. 4.

FIG. 5A is a waveform showing the audio signal received at the input terminal 40. This waveform includes the discontinuous periods having time intervals $T_1$ and $T_2$ in the middle of the signal waveform S. It will be noted that the audio signal S having the discontinuous periods and having an irregular time interval can be generated by changing the reproduction speed during a slow reproduction operation of the video tape recorder or the video disk player. It will also be appreciated that adjusting the time interval of the discontinuous period will reduce offensive qualities of the sound provided to the listener.

Figure 5B:

FIG. 5B is a waveform wherein the signal shown in FIG. 5A is delayed by the first delay 42 in FIG. 4. Preferably, the delay time by the first delay 42 is the same as the time interval between the discontinuous periods.

Figure 5C:
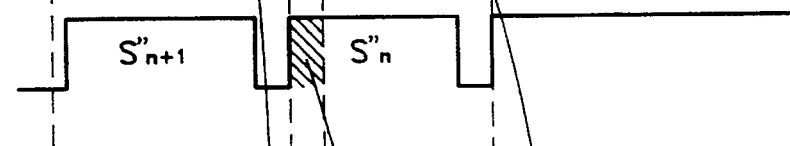
Figure 5D:
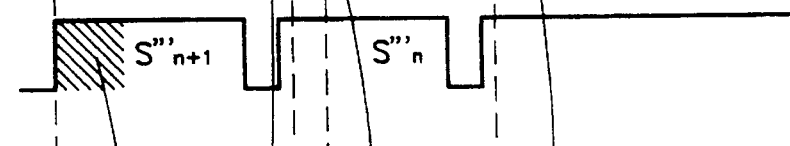

FIGS. 5C and 5D are waveforms showing two examples in which the signals shown in FIG. 5B are again delayed using second delay 44. FIG. 5C shows the signal at the output of the ith connection point $44_i$ of the second delay 44 while FIG. 5D shows the signal at the output of the (i+1)th connection point $44_{(i+1)}$. Since the delay characteristic of the all the delay elements comprising the second delay 44 is $\Delta T$, the waveform of FIG. 5C is delayed from the waveform of FIG. 5B by the value $i\Delta T$ and the waveform of FIG. 5D is delayed by the value $(i+1)\Delta T$. In this manner, the waveform from the nth connection point $44_n$ becomes the waveform delayed by the value $n\Delta T$.

Figure 5E:
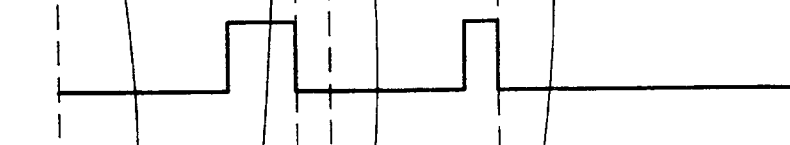

FIG. 5E is a waveform showing the signal detected by the first signal-free period detector 46. The first signal-free period detector 46 detects a signal-free period $T_1$ or $T_2$ and generates the selection control signal corresponding thereto to be supplied to the first selection switch 50. The first selection switch 50 selects one of the signals available from the respective connection points of the second delay 44 in accordance with the selection control signal and outputs the selected signal, i.e., a variably delayed form of the delay audio signal output from first delay 42. Preferably, the delay characteristic of the signal output from the first selection switch 50 is the same as the value of the signal-free period detected by the first signal-free period detector 46. For example, if the value of $T_1$ detected by the first signal-free period detector 46 is the same as $i\Delta T$, the first selection switch 50 will select a terminal connected with the connection point which outputs the shaded portion of the audio signal shown in FIG. 5C.

Figure 5F:

FIG. 5F is a waveform of the control signal generated by the second signal-free period detector 48. It will be noted that this second control signal is a logic signal maintaining a high state only in the discontinuous period of the audio signal shown in FIG. 5B.

Figure 5G:

FIG. 5G is a waveform of the signal generated by the second selection switch 52 in FIG. 4, which illustrates that the shaded part of the waveform shown in FIG. 5C, i.e., the rear part corresponding to the time interval $T_1$ of the discontinuous period in the signal waveform $S''_n$ is synthesized in the discontinuous period of the waveform $S'_n$ shown in FIG. 5B.

It is be appreciated that the apparatus disclosed in FIG. 4 can be adapted to cope with an audio signal whose frequency of the discontinuous period is variable by varying the delay characteristic of the first delay 42.

As described above, the audio signal reproduction apparatus according to the present invention which is adopted for a slow reproduction in a video tape recorder or a video disk player can reproduce the audio signal which could not be reproduced during a conventional slow reproduction operation.

Preferably, the audio signal reproduction apparatus according to the present invention can compensate an input audio signal having an irregular discontinuous period by a suitable time interval corresponding to the discontinuous period to thereby supply an output audio signal whose discontinuous period is effectively eliminated.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An audio signal reproducing apparatus which sequentially reproduces an audio signal recorded in adjacent tracks while compensating the audio signal for discontinuous periods having a time interval T produced during a slow reproduction operation, said apparatus comprising:

a delay for generating a delay audio signal from a received audio signal, wherein a delay amount provided by said delay is at least equal to said time interval T;

signal-free period detector means for detecting the discontinuous periods in which said received audio signal is discontinuous; and a switch operatively connected to and controlled by said signal-free period detector means for selectively providing one of said received audio signal and said delayed audio signal to thereby generate an output audio signal without the discontinuous periods.

2. The audio signal reproducing apparatus as claimed in claim 1, wherein said delay comprises an analog delay means.

3. The audio signal reproducing apparatus as claimed in claim 1, wherein said signal-free period detector means comprises a comparator.

4. An audio signal reproducing apparatus which sequentially reproduces the audio signal recorded in adjacent tracks with a time interval T, comprising:

a first delay for generating a delayed audio signal from a received audio signal;

a second delay including a plurality of serially connected delay elements receiving said delayed audio signal;

a first signal-free period detector for detecting a discontinuous first period of said received audio signal for generating a first control signal;

a second signal-free period detector for detecting a discontinuous second period of delayed audio signal and for generating a second control signal;

a first selection switch receiving respective output audio signals from said delay elements to thereby generate a variably delayed audio signal delayed by a predetermined delay amount in response to said first control signal; and a second selection switch for selectively providing one of said delayed audio signal and said variably delayed audio signal in response to said second control signal.

5. The audio signal reproducing apparatus as claimed in claim 4, wherein said delay amount of said delay elements of said second delay is equal to an integer times a field period of an image signal.

6. The audio signal reproducing apparatus as claimed in claim 4, wherein said first delay comprises an analog delay means.

7. A method for compensating an audio signal for discontinuities produced during a slow reproduction operation, said method comprising the steps of:

(a) delaying a received audio signal for a predetermined period of time based on a repetitive discontinuous period to thereby produce a delayed audio signal, said predetermined period of time corresponding to a time interval of said repetitive discontinuous period;

(b) generating a control signal indicative of said discontinuous period in said received audio signal; and (c) selectively providing one of said received audio signal and said delayed audio signal response to said control signal to thereby generate and output an audio signal free of said repetitive discontinuous period.

* * * * *